United States Patent
Ogawa (10) Patent No.: US 7,587,552 B2
(45) Date of Patent: Sep. 8, 2009

(54) COMPUTER SYSTEM AND PERFORMANCE TUNING METHOD

(75) Inventor: Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 385 days.

(21) Appl. No.: 11/581,569

(22) Filed: Oct. 17, 2006

(65) Prior Publication Data

US 2008/0059750 A1    Mar. 6, 2008

(30) Foreign Application Priority Data

Sep. 5, 2006  (JP)  ............... 2006-240030

(51) Int. Cl.
G06F 12/16   (2006.01)
G06F 11/30   (2006.01)

(52) U.S. Cl. ................ 711/114; 711/162; 714/47

(58) Field of Classification Search ............ None
See application file for complete search history.

(56) References Cited

U.S. PATENT DOCUMENTS 7,356,452 B1 * 4/2008 Naamad et al. ............ 703/22

2002/0099908 A1   7/2002  Yamamoto et al.
2003/0093619 A1 * 5/2003  Sugino et al. ............ 711/114
2003/0233518 A1 * 12/2003 Yamagami et al. ........ 711/114

FOREIGN PATENT DOCUMENTS

JP      2000-293317      4/1996

* cited by examiner

Primary Examiner—Than Nguyen
(74) Attorney, Agent, or Firm—Stites & Harbison PLLC; Juan Carlos A. Marquez, Esq.

(57) ABSTRACT

A computer system includes a host computer; a first storage system that processes an I/O request issued by the host computer; and a second storage system that receives host I/O information and performance information from the first storage system and reproduces, based on the host I/O information and performance information, the internal processing conditions of the first storage system at the time the I/O request was processed, thereby simulating the I/O performance of the first storage system.

8 Claims, 8 Drawing Sheets

HOST I/O INFORMATION

| ID | RECEPTION TIME | RESPONSE TIME | CDB | OPERATING CONDITION |
|---|---|---|---|---|
| 1 | 12:34:56 123 | 12:34:56 234 | 2a000119d5 d800000800 | |
| 2 | 12:34:56 345 | 12:34:56 456 | 28000210e9 8000000800 | CACHE HIT |
| 3 | 12:34:57 012 | 12:34:58 340 | 2a0009d91a a800000a00 | DATA PROCESSING TIME 100ms |
| ⋮ | ⋮ | ⋮ | ⋮ | ⋮ |

PERFORMANCE INFORMATION 501

| LUN | RAID TYPE | DRIVE | PERFORMANCE TUNING PARAMETERS | |
|---|---|---|---|---|
| 0 | RAID5 4D+1P | FC 15krpm 72GB | READ-AHEAD : ON<br>READ-AHEAD AMOUNT : 1MB<br>STRIPE SIZE : 64KB<br>SEGMENT SIZE : 16KB | ... |
| | | FC 15krpm 72GB | | |
| | | FC 15krpm 72GB | | |
| | | FC 15krpm 72GB | | |
| | | FC 15krpm 72GB | | |
| 1 | RAID1+0 2D+2D | FC 15krpm 146GB | READ-AHEAD : OFF<br>STRIPE SIZE : 512KB<br>SEGMENT SIZE : 512KB | ... |
| | | FC 15krpm 146GB | | |
| | | FC 15krpm 146GB | | |
| | | FC 15krpm 146GB | | |
| 2 | RAID6 3D+2P | SATA 7.2krpm 150GB | READ-AHEAD : ON<br>READ-AHEAD AMOUNT : 1MB<br>STRIPE SIZE : 512KB<br>SEGMENT SIZE : 64KB | ... |
| | | SATA 7.2krpm 150GB | | |
| | | SATA 7.2krpm 150GB | | |
| | | SATA 7.2krpm 150GB | | |
| | | SATA 7.2krpm 150GB | | |
| ⋮ | ⋮ | ⋮ | ⋮ | |

502

| CONTENT | FIGURES |
|---|---|
| CPU USE RATE | 70% |
| CACHE DATA AMOUNT | 40% |
| ⋮ | ⋮ |

COMPUTER SYSTEM AND PERFORMANCE TUNING METHOD

CROSS-REFERENCES TO RELATED APPLICATIONS

This application relates to and claims priority from Japanese Patent Application No. 2006-240030, filed on Sep. 5, 2006, the entire disclosure of which is incorporated herein by reference.

BACKGROUND

The invention relates generally to a computer system and performance tuning method used for tuning the I/O performance of a storage system.

In line with developments in computer systems, uses for storage systems have diversified. With that diversification, the characteristics (I/O characteristics) of input/output requests (I/O requests) host computers issue to storage systems have also diversified. In order to improve the performance of the storage systems in relation to I/O requests with various I/O characteristics, it is effective to carry out performance tuning suitable for the respective I/O characteristics. For example, Japanese Patent Laid-Open Publication No. 2000-293317 proposes a storage system being able to improve the I/O performance, even when an I/O request a host computer issues is a sequential access or when the I/O request is a random access and the cache hit rate is low.

Usually, users who design or use computer systems know the I/O characteristics of the application programs operating on host computers. Accordingly, the users carry out performance tuning for the storage systems based on the I/O characteristics of the I/O requests issued by the application programs.

However, the application-level I/O characteristics the users can easily be aware of are sometimes different from the I/O characteristics of the I/O requests the storage systems receive from the host computers. This is because the I/O characteristics of the I/O requests issued by the host computers change when affected by the operating systems, file systems, device drivers, and host bus adapters (hereinafter called "OS/FS/driver/HBAs") in the host computers. For example, there are cases where, with the buffer size in an operating system being limited, an I/O request issued by an application program is divided into a plurality of I/O requests, or cases where even though the application program makes an access to a file of extremely large size, the I/O request is divided into a plurality of small-sized I/O requests in the file system.

There are also some cases where the operating systems or file systems function to improve the I/O performance in terms of cache hits by reading ahead data from a read target range wider than the read target range designated by the I/O requests issued by the application programs, or issue I/O requests with less I/O multiplicity than the I/O requests issued by the application programs, because the I/O multiplicity is limited owing to the hardware specifications of the host bus adapters in the host computers.

As described above, although there are differences between the application-level I/O characteristics the users can easily be aware of and the I/O characteristics of I/O requests the storage systems receive from the host computers, the users often carry out performance tuning for the storage systems based on the application-level I/O characteristics. Accordingly, the performance of the storage systems degrade due to their inappropriate performance tuning.

Moreover, the characteristics of the I/O requests the host computers issue to the storage systems have become complicated and they change not only when the application programs in the host computers are changed, but also when the OS/FS/driver/HBAs in the host computers are changed. Therefore, it is necessary to carry out performance tuning for the storage systems by taking into consideration the effect(s) the OS/FS/driver/HBAs in the host computers have on the I/O requests issued by the application programs.

Furthermore, because client storage systems operate continuously in most cases, it is difficult to test the effect of improvement of the performance tuning for their storage systems.

Therefore, it is an object of this invention to carry out performance tuning for a storage system while taking into consideration the effect the OS/FS/driver/HBAs in a host computer have on I/O requests issued by an application program.

SUMMARY

In order to achieve the above object, this invention provides a computer system including: a host computer; a first storage system that processes an I/O request issued from the host computer; and a second storage system that receives host I/O information and performance information from the first storage system and reproduces, based on the host I/O information and performance information, the internal processing conditions of the first storage system at the time the I/O request was processed, thereby simulating the I/O performance of the first storage system.

With this structure, performance tuning can be carried out for a storage system while taking into consideration the effect the OS/FS/driver/HBAs in a host computer have on I/O requests issued by an application program.

The second storage system preferably changes the settings for tuning parameters into various settings while reproducing the internal processing conditions of the first storage system at the time the I/O request was processed, thereby testing whether any improvement has been made in the performance.

Because the internal processing conditions of the first storage system at the time an I/O request is processed can be reproduced in the second storage system as many times as possible, whether the performance has been improved or not can be tested effectively by changing the settings for the tuning parameters in various ways.

The second storage system preferably presents a user with an example of a change to be made in the settings for a tuning parameter having room for improvement.

The host I/O information contains, for example, any of: a reception time indicating the time when the first storage system received the I/O request from the host computer, a response time indicating the time when the first storage system completed the processing for the I/O request, a command data block of the I/O request, and the operation conditions of the first storage system at the time the I/O request was processed.

The performance information contains, for example, any of: the RAID type of a RAID group in the first storage system, a physical specification of a plurality of storage devices constituting the RAID group, and a resource usage rate for the first storage system.

This invention also provides a performance tuning method including: processing, in a first storage system, an I/O request issued from a host computer; sending host I/O information and performance information from the first storage system to a second storage system; and reproducing, in the second storage system, the internal processing conditions of the first storage system at the time the I/O request was processed, based on the host I/O information and performance information, thereby simulating the I/O performance of the first storage system.

With this method, performance tuning can be carried out for a storage system while taking into consideration the effect the OS/FS/driver/HBAs in a host computer have on I/O requests issued by an application program.

This performance tuning method may further include a step of changing the settings of tuning parameters into various settings while reproducing, in the second storage system, the internal processing conditions of the first storage system at the time the I/O request was processed, thereby testing whether any improvement has been made in the performance.

This performance tuning method may further include a step in which the second storage system presents a user with an example of a change to be made in the settings for a tuning parameter having room for improvement.

According to this invention, performance tuning can be carried out for a storage system while taking into consideration the effect OS/FS/driver/HBAs in a host computer have on I/O requests issued by an application program.

DETAILED DESCRIPTION OF PREFERRED EMBODIMENTS

A computer system according to an embodiment of this invention includes: a host computer; a practically-operating storage system that processes I/O requests issued from the host computer; and an I/O performance-reproducing storage system that receives host I/O information and performance information from the practically-operating storage system and reproduces, based on the host I/O information and performance information, the internal processing conditions of the practically-operating storage system when processing the I/O requests, thereby simulating the I/O performance of the practically-operating first storage system. Here, the host I/O information contains, for example, any of: a reception time indicating the time when the practically-operating storage system receives the I/O request from the host computer, a response time indicating the time when the practically-operating storage system completes the processing for the I/O request, the I/O request command data block, and the operation conditions of the practically-operating storage system at the time of processing the I/O request. The performance information contains, for example, any of: the RAID type of a RAID group in the practically-operating storage system, physical specifications of a plurality of storage devices constituting the RAID group, and a resource use rate of the practically-operating storage system.

Example

Figure 1:
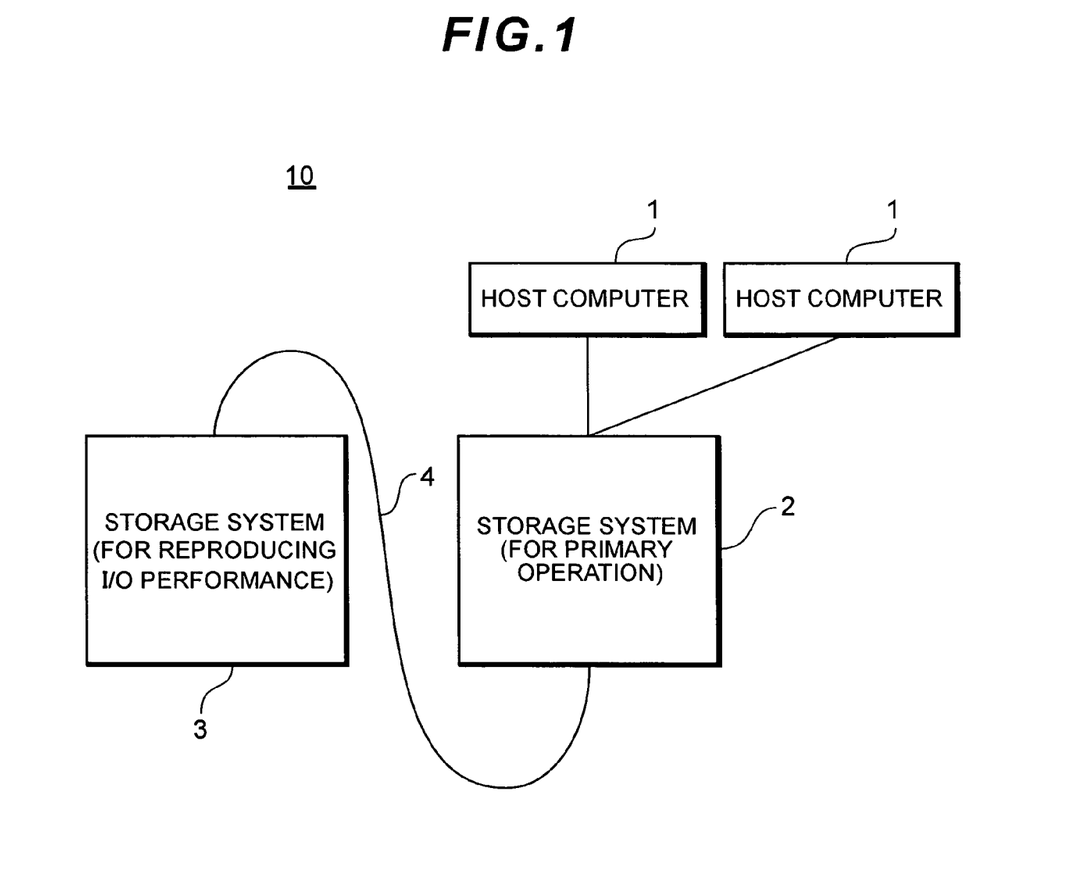
FIG. 1 shows the structure of a computer system according to an embodiment of this invention.

FIG. 1 shows the structure of a computer system 10 according to an example of this invention. This computer system 10 includes: one or more host computers 1, a practically-operating storage system 2, and an I/O performance-reproducing storage system 3.

The host computers 1 are personal computers, work stations or mainframe computers. They are connected to the storage system 2 via block I/O interfaces and issue I/O requests to the storage system 2 to access data in the storage resources in the storage system 2. The host computers 1 use the storage resources in the storage system 2 to execute various service processing (for example, database processing, web application processing, streaming processing, etc). The storage system 2 is connected to the storage system 3 via a network 4 and sends/receives host I/O information and performance information to/from the storage system 3. Details of the host I/O information and performance information will be given later (see FIGS. 5 and 6).

The machine performance of the storage system 2 and that of the storage system 3 are preferably the same. The point connecting the host computers 1 and the storage system 2 and the point connecting the storage system 2 and storage system 3 may be the same or different. The host computers 1 and storage system 2 may be connected directly without involving a network or connected via a network such as a SAN (Storage Area Network), LAN (Local Area Network), PAN (Personal Area Network), MAN (Metropolitan Area Network), WAN (Wide Area Network), the Internet, a private line, or a public line.

If the host computers 1 are connected to the storage system 2 via a SAN, they request the input/output of data in blocks, which are the data management units for the storage resources in the storage system 2, in accordance with a protocol such as Fibre Channel Protocol or iSCSI (Internet Small Computer System Interface) protocol.

If the host computers 1 are connected to the storage system 2 via a LAN, they request the input/output of data in files, designating file names, in accordance with protocols such as NFS (Network File System) or CIFS (Common Interface File System) protocol.

Figure 2:
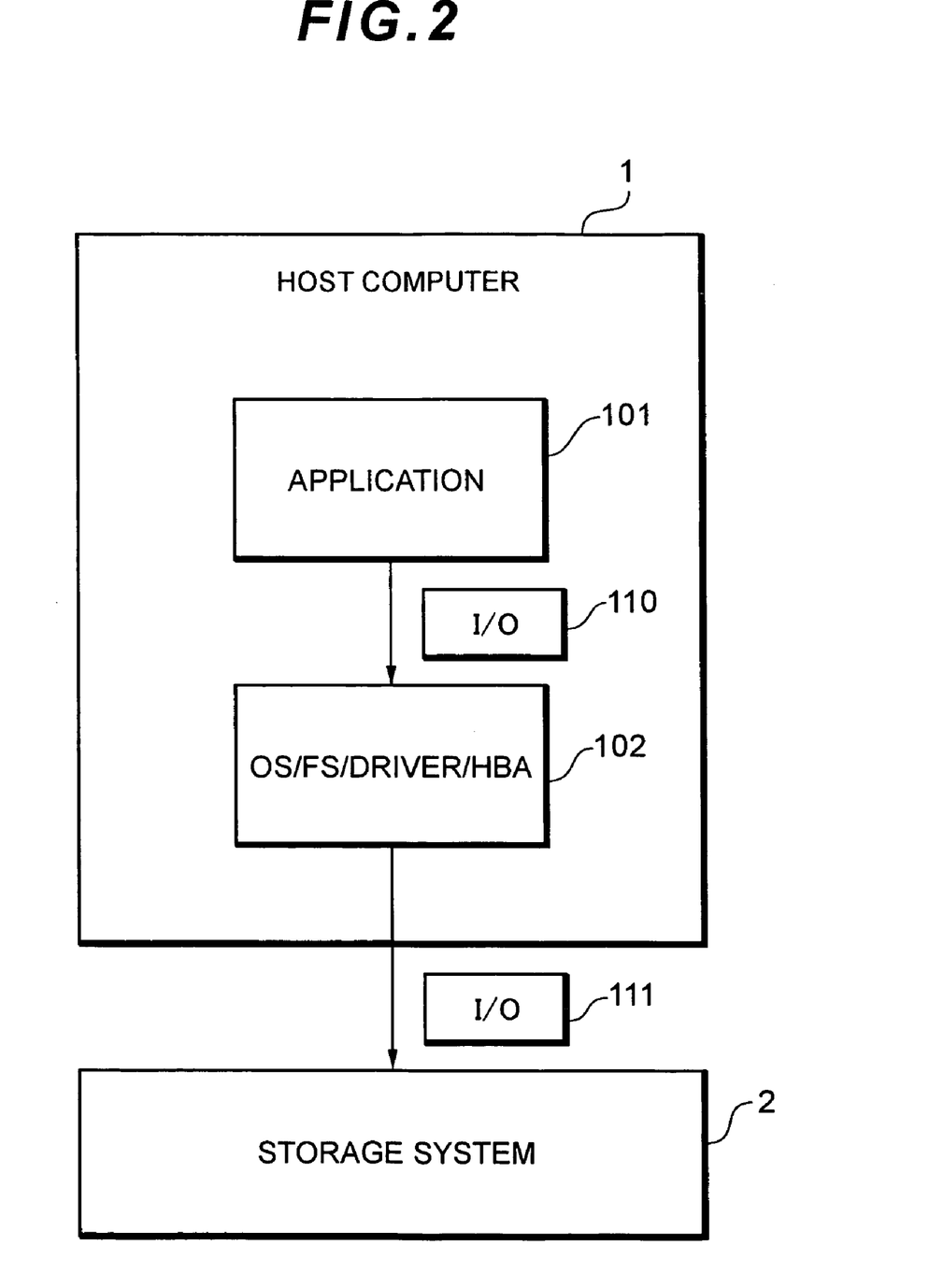
FIG. 2 is an explanatory diagram showing the situation where an I/O request a host computer issues to a storage system is influenced by OS/FS/driver/HBAs.

FIG. 2 is an explanatory diagram showing the situation where an I/O request one of the host computers 1 issues to the storage system 1 is influenced by OS/FS/driver/HBAs. In each host computer 1, an application program 101 issues I/O requests 110. An I/O request 110 has I/O characteristics the user of the host computer 1 can easily recognize. The I/O characteristics of the I/O request 110 can be found based on the size of the file accessed by the application program 101 and the data access pattern of the application program 101. After the I/O request 110 is issued by the application program 101, its I/O characteristics change when influenced by the OS/FS/driver/HBA 102, and then issued to the storage system 2 as an I/O request 111. The I/O characteristics of the I/O request 111 are sometimes different from the I/O characteristics of the I/O request 110 the user knows.

Figure 3:
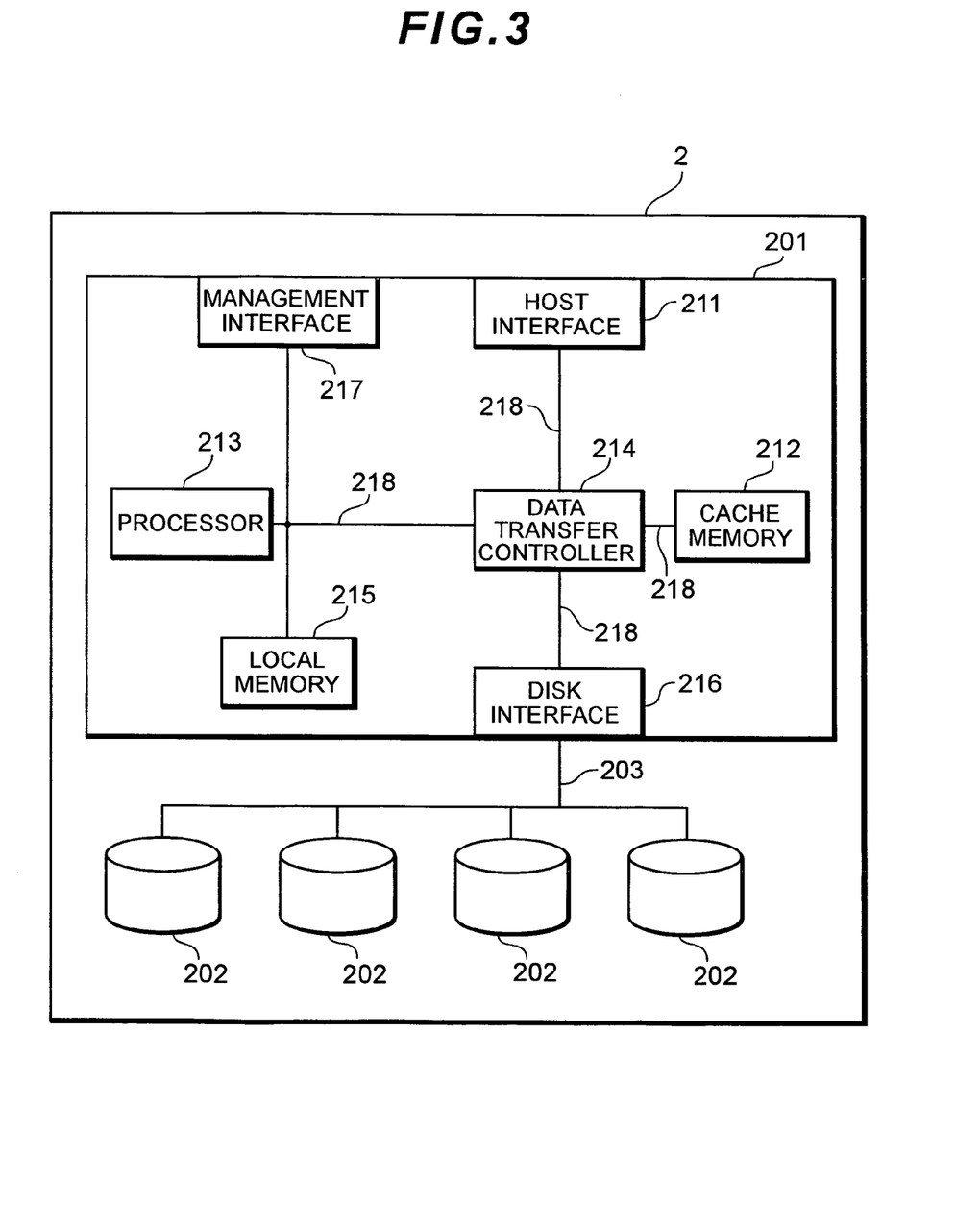
FIG. 3 is a hardware structural diagram of the storage system.

FIG. 3 shows the hardware structure of the storage system 2. This storage system 2 has a controller 201, a plurality of disk drives 202, and a bus 203 for connecting the controller 201 and disk drives 202.

Examples of the disk drives 202 include FC (Fibre Channel) disk drives, SATA (Serial Advanced Technology Attachment) disk drives, PATA (Parallel Advanced Technology Attachment) disk drives, FATA (Fibre Attached Technology Adapted) disk drives, and SCSI (Small Computer System Interface) disk drives.

The controller 201 controls the disk drives 202 at a RAID level (for example, RAID 0, 1, 4, 5, 6) regulated by the RAID system. A RAID group is formed by making, for example, four disk drives 202 into one group (3D+1P), or making eight disk drives 202 into one group (7D+1P). In other words, one RAID group is formed using a set of storage areas provided by a plurality of disk drives 202. RAID groups may alternatively be called parity groups or ECC groups. For each RAID group, one or more logical volumes, which are access units for the host computers 1, are defined. These logical volumes are assigned respective LUNs (Logical Unit Numbers).

The controller 201 includes a host interface controller 211, cache memory 212, processor 213, data transfer controller 214, local memory 215, disk interface controller 216, management interface 217, and internal bus 218 for connecting these components.

The processor 213 controls the I/O (write access or read access) to/from the disk drives 202 in response to data input/output requests from the host computers 1. The local memory 215 stores various kinds of control programs and information. The processor 213 runs the control programs stored in the local memory 215 to send/receive the host I/O information and performance information to/from the storage system 3. The cache memory 212 is buffer memory for temporarily storing data read/written from/to the disk drives 202. It has a power source backup and is structured as non-volatile memory, to prevent the loss of cache data if a power failure occurs in the storage system 2.

The data transfer controller 214 connects the host interface controller 211, cache memory 212, processor 213, local memory 215, and disk interface controller 216 to one another; and controls the data transfer between the host computers 1 and disk drives 202.

For example, in response to write access from a host computer 1, the data transfer controller 214 writes the write data it receives from the host computer 1 via the host interface controller 211 in the cache memory 212. Then, the disk interface controller 216 writes the write data written in the cache memory 212 in the disk drives 202.

On the other hand, in response to read access from the host computer 1, the data transfer controller 214 reads read data from the disk drives 202 via the disk interface controller 216, writes it in the cache memory 212, and transfers it to the host interface controller 211. The host interface controller 211 sends the read data to the host computer 1.

Incidentally, when the disk drives 202 are managed at RAID level 5, parity data is computed by the data transfer controller 214.

The host interface controller 211 is for controlling interfaces between the host computers 1 and the controller 201 and has a function that receives Fibre Channel Protocol-based block access requests and file transfer protocol-based file access requests from the host computers 1. To process the file access requests from the host computers 1, the host interface controller 211 needs to serve as a NAS (Network Attached Storage).

The disk interface controller 216 is for controlling interfaces between the disk drives 202 and controller 201 and has a function that controls the requests to input/output data to/from the disk drives 202 in accordance with the protocols controlling the disk drives 202.

The management interface 217 receives management commands the management computer (not shown in the drawing) issues to the storage system 2. A storage manager inputs management commands in the management computer to make configuration settings for the disk drives 202, obtain the configuration information for the storage system 2, make settings for paths between the host computers 1 and host interface controller 211, and install micro programs executed in the host interface controller 211 and disk interface controller 216. Here, making configuration settings for the disk drives 202 is to, for example, increase or decrease the number of disk drives 202, or to change the RAID configuration (for example, from RAID 1 to RAID 5). The management computer can also be used to check the operation conditions of the storage system 2 or to identify faulty parts.

Incidentally, the host interface controller 211 and management interface 217 may not necessarily be separate devices. The host interface controller 211 may also function as a management interface 217.

The hardware structure of the storage system 3 is the same as that of the storage system 2, so detailed explanations will be omitted.

Figure 4:
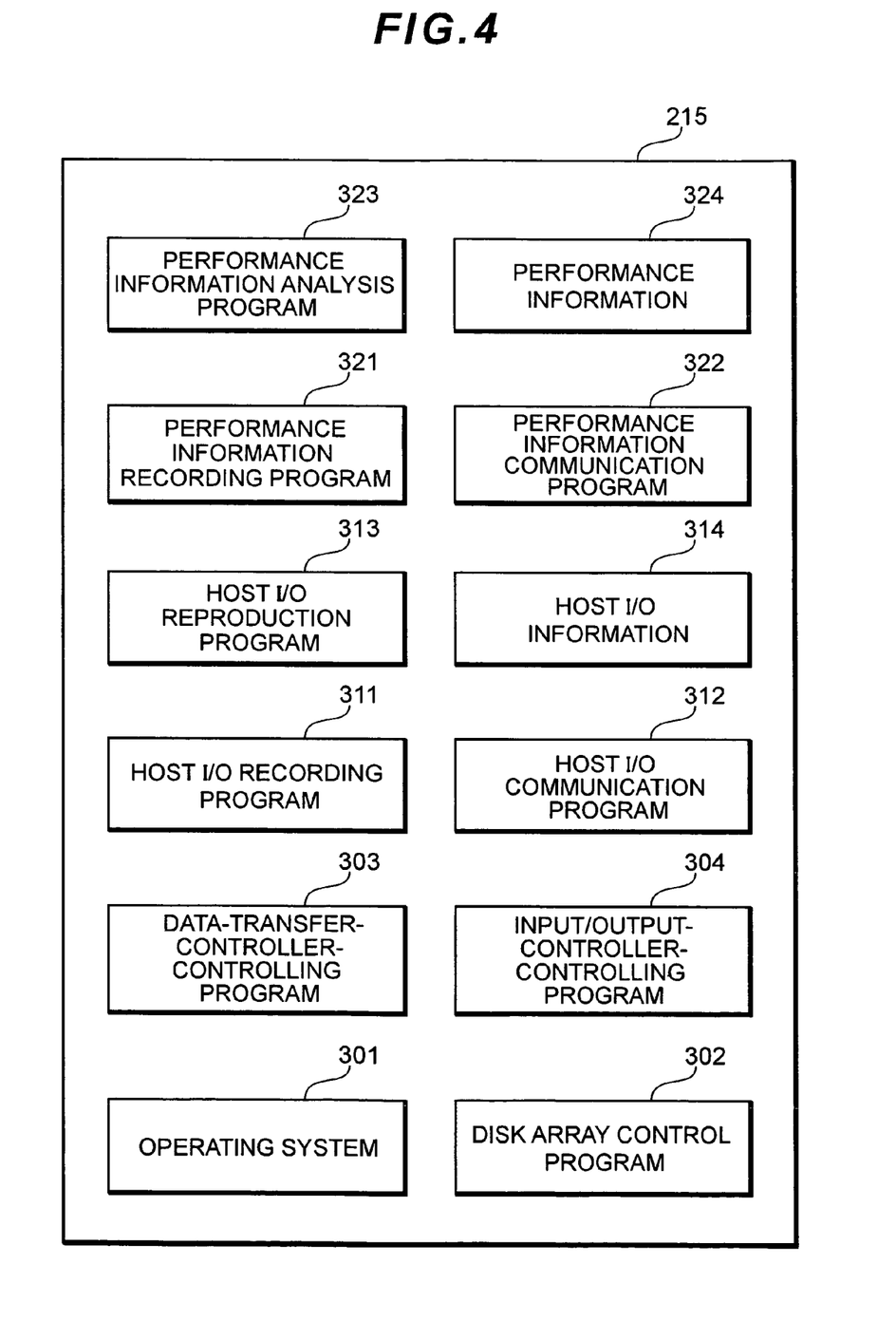
FIG. 4 is an explanatory diagram showing various control programs and information stored in local memory.

FIG. 4 shows the various control programs and information stored in the local memory 215. As shown in the drawing, the local memory 215 stores operating system 301, disk array control program 302, data-transfer-controller-controlling program 303, input/output-controller-controlling program 304, host I/O recording program 311, host I/O communication program 312, host I/O reproduction program 313, host I/O information 314, performance information recording program 321, performance information communication program 322, performance information analysis program 323, and performance information 324.

Although the host I/O reproduction program 313 and performance information analysis program 323 do not have to be stored in the local memory 215 in the storage system 2 but should be stored in the local memory in the storage system 3, they are shown in FIG. 2 for the ease of explanation.

The operating system 301 has a function that schedules the execution of the respective control programs 302, 303, 304, 311, 312, 313, 321, 322 and 323.

The disk array control program 302 carries out RAID conversion and logical addresses/physical addresses conversion.

The data-transfer-controller-controlling program 303 is for controlling data transfer between the host interface controller 211, cache memory 212, processor 213, local memory 215, and disk interface controller 216; and is run by the data transfer controller 214.

The input/output-controller-controlling program 304 is for controlling the host interface controller 211 and disk interface controller 216.

The host I/O recording program 311 is for recording I/O requests 111 the host computers 1 issue to the storage system 2.

The host I/O communication program 312 is for the transmission of the host I/O information 314 between the storage system 2 and storage system 3.

The host I/O reproduction program 313 is for reproducing I/O requests 111 the host computers 1 issue to the storage system 2 based on the host I/O information 314. This program is loaded in the storage system 3 so that the I/O requests 111 are reproduced there.

The host I/O information 314 includes information (such as reception times, response times, CDBs, operation conditions) regarding the I/O requests 111 the host computers 1 issue to the storage system 2.

The performance information recording program 321 is for recording the information for I/O processing performance, such as the operation conditions of the storage systems 2 and 3.

The performance information communication program 322 is for the transmission of the performance information 324 between the storage system 2 and the storage system 3.

The performance information analysis program 323 is for analyzing the performance information 324. This program is loaded in the storage system 3 to analyze the performance information 324 the storage system 2 sends to the storage system 3.

The performance information 324 includes information regarding I/O processing performance, such as the operation conditions of the storage systems 2, 3.

Figure 5:
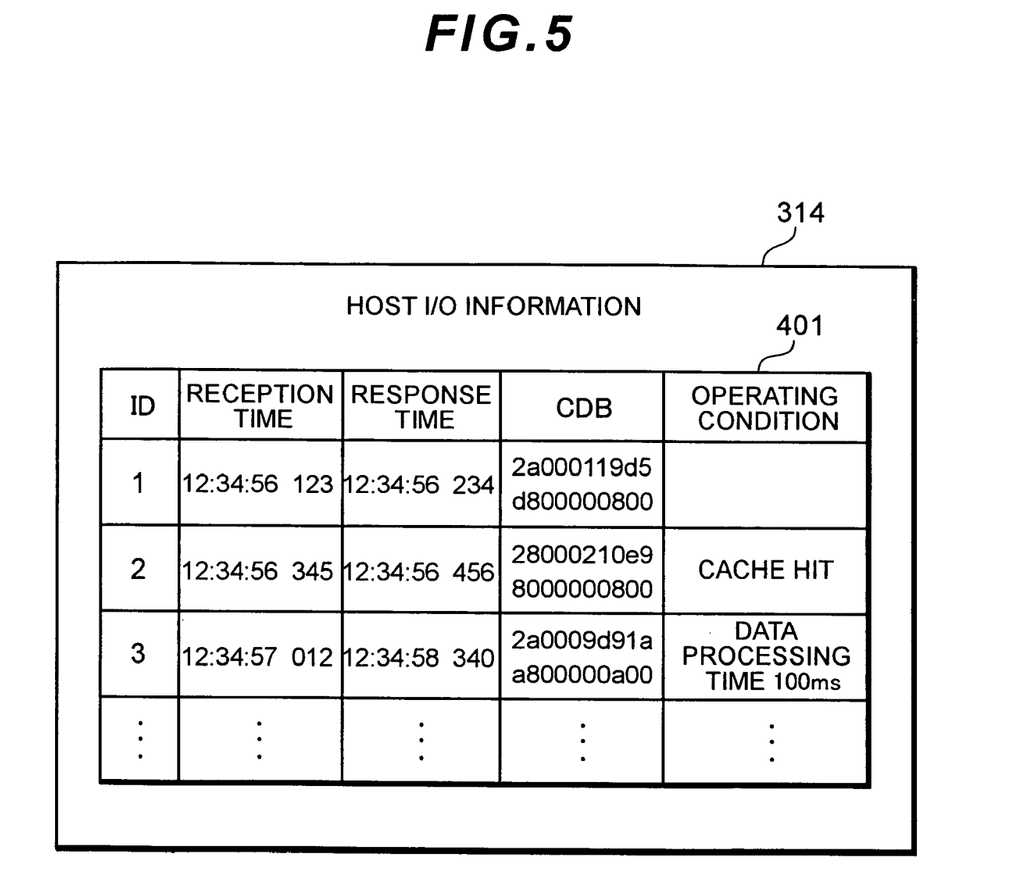
FIG. 5 is an explanatory diagram showing the table structure of host I/O information.

FIG. 5 shows the table structure of the host I/O information 314. As shown in the drawing, the host I/O information 314 contains a host I/O table 401. This table 401 stores, for each I/O request 111 the storage system 2 receives from the host computers 1, an ID uniquely assigned in the storage system 2, reception time indicating the time when the storage system 2 received the I/O request 111, response time indicating the time when the storage system 2 completed the processing for the I/O request 111, command type of the I/O request 111 (read/write command distinction), CDB (command data block) indicating an access destination address, and the operation conditions of the storage system 2 when it processes the I/O request 111 (whether there are any cache hits or not, the time required for data processing, etc), these elements being associated with one another.

The operation conditions stored in the host I/O table 401 include information regarding cache hits—e.g., "there are cache hits for all data," "there are cache hits for only some data," "there are no cache hits for any data," and the table also includes, when the storage system 2 has an encryption or data compression function, the time required for the encryption processing or data compression processing. The time required for the encryption processing or similar changes depending on the implementation manner as well as the content of the data. In order to precisely reproduce operations, it is desirable that the storage system 2 sends data to the storage system 3; however, when taking into consideration that the data runs through the network 4, it is preferable for security reasons that the storage system 2 sends only the time required for the processing to the storage system 3.

The internal processing conditions of the storage system 2 when the storage system 2 processes an I/O request 111 received from the host computer 1 are influenced to a great extent by the tuning parameters, RAID configurations and physical specifications of the disk drives 202 in the storage system 2 as well as by whether any internal processing (encryption processing or data compression processing) was being carried out in the storage system 2 or not. Reproducing the same internal processing conditions in the storage system 3 as those in the storage system 2 at the time the I/O request 111 from the host computer 1 was processed requires: the tuning parameters, RAID configurations and physical specifications of the disk drives 202 in the storage system 2, as well as the information concerning whether any internal processing (encryption processing or data compression processing) was being carried out in the storage system 2 or not ("internal processing conditions reproduction information"). Some information included in the internal processing conditions reproduction information is the information stored in the host I/O table 401, and other information is the performance information 324, which will be described later.

The storage system 3 does not have to receive from the storage system 2 the data the storage system 2 actually received from the host computer 1, because with the host I/O information 314 and performance information 324 sent from the storage system 2, it can reproduce in itself the same internal processing conditions as those in the storage system 2 at the time the I/O request 111 was processed.

It may also be possible to set things so that the storage system 2 directly transfers the data it receives from the host computer 1 to the storage system 3. If so, the storage system 3 does not have to receive the host I/O information 324 from the storage system 2, because by receiving the performance information 324 from the storage system 2, it can reproduce in itself the same internal processing conditions as those in the storage system 2 at the time the I/O request 111 was processed.

Figure 6:
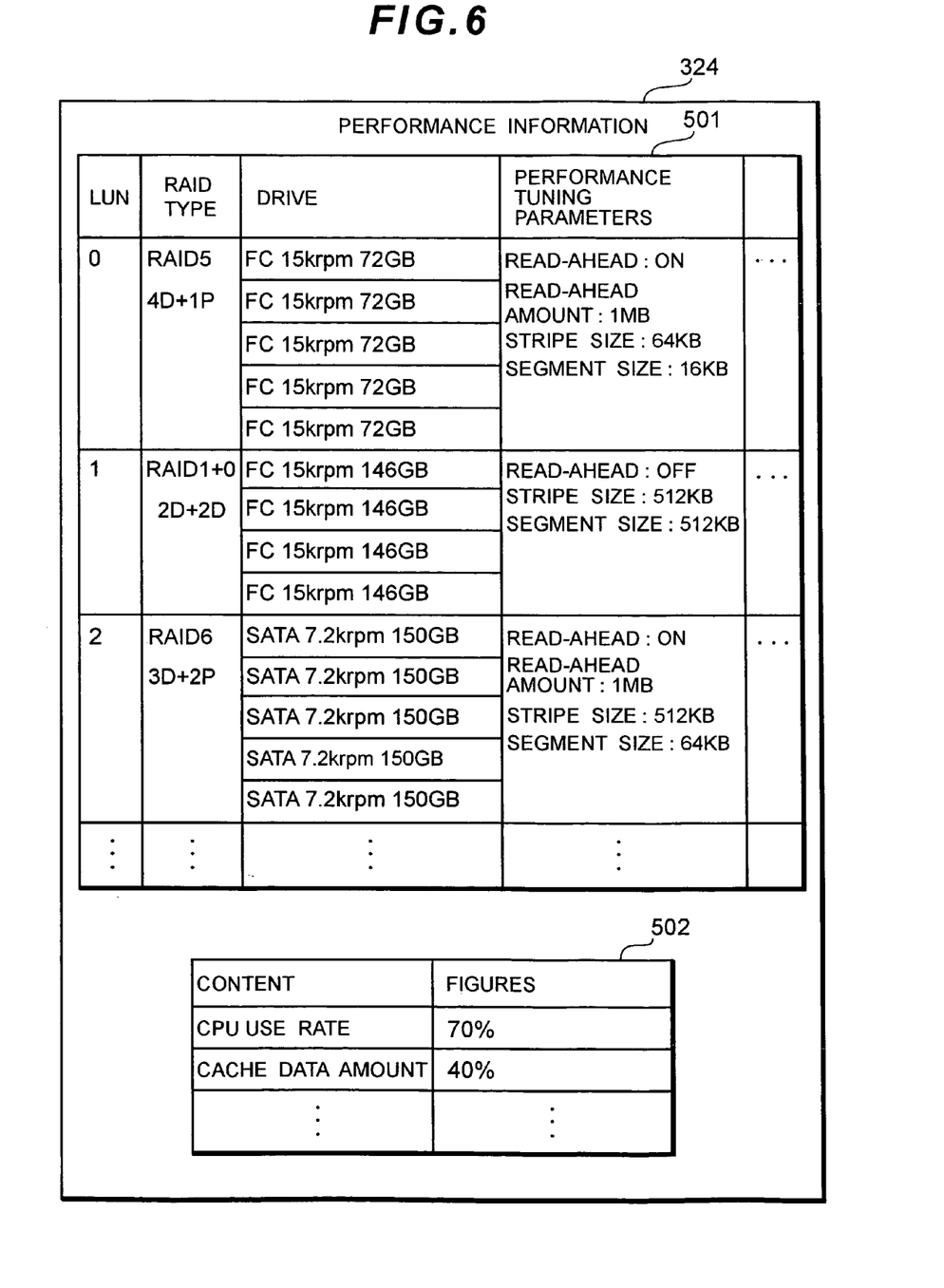
FIG. 6 is an explanatory diagram showing the table structure of performance information.

FIG. 6 shows the table structure of the performance information 324. As shown in the drawing, the performance information 324 includes a performance parameter table 501 and performance condition table 502.

The performance parameter table 501 manages the LUNs assigned to the respective RAID groups, the RAID types of the RAID groups, the physical specifications (drive types, rotation frequency, capacities, etc) of the disk drives 202 constituting the RAID groups, and the performance-tuning parameters, these elements being associated with one another. The performance tuning parameters have two types: tuning parameters for internal controls; and tuning parameters for external specifications. Examples of the internal control-related tuning parameters include "read-ahead" for sequential reading, and "bulk writing" for sequential writing. Examples of external specification-related tuning parameters include: "RAID level," "drive configuration," "disk type," and "stripe size."

The performance condition table 502 includes information (for example, CPU use rate, cache data amount, etc) indicating the operation conditions of the storage system 2.

Although the resource information a common storage system has as its performance tuning parameters is listed above as an example of the performance information 324, the performance information 324 may also contain information having effects on the I/O performance of the storage system 2, such as the cache size the respective RAID groups can use, the modes internal processing systems (for example, encryption function and data compression function) are in, and the use rate of the internal bus and other resources.

Figure 7:
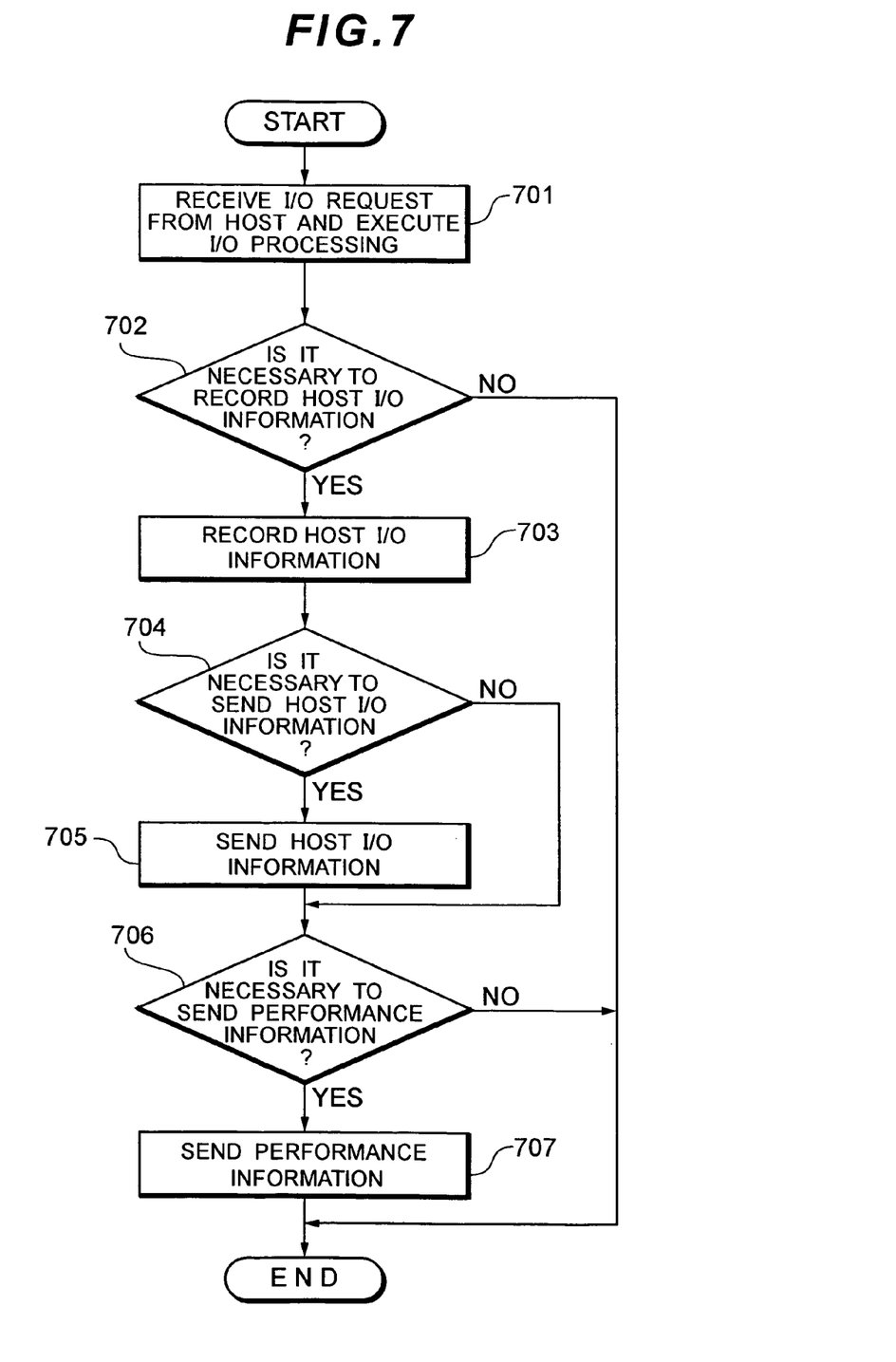
FIG. 7 is a flowchart showing the processing for sending host I/O information and performance information from a practically-operating storage system to performance-reproducing storage system.

FIG. 7 is a flowchart showing a processing routine in which the storage system 2 sends the host I/O information 314 and performance information 324 to the storage system 3. Upon receiving an I/O request 111 from a host computer 1, the storage system 2 processes this I/O request 111 (step 701).

The storage system 2 judges whether it is necessary to record the host I/O information 314 in its local memory 215 (step 702). The judgment is made based on whether there is an instruction by the storage manager to record the host I/O information 314 for the performance tuning.

If it is unnecessary to record the host I/O information 314 (step 702; No), the storage system 2 terminates this processing routine.

Meanwhile, if it is necessary to record the host I/O information 314 (step 702; Yes), the storage system 2 records the host I/O information 314 in its local memory 215 (step 703).

The storage system 2 then judges whether it is necessary to send the host I/O information 314 to the storage system 3 (step 704).

In the storage system 3, the host I/O information 314 is used for reproducing the internal processing conditions. The internal processing condition reproduction in the storage system 3 does not have to be conducted in synchronization with the processing for the I/O request 111 in the storage system 2, and accordingly, it is effective in terms of loads on the network 4 that "a certain amount of host I/O information 314 is collectively sent from the storage system 2 to the storage system 3. The judgment in step 704 is made based on whether the buffer storing the host I/O information 314 is full or not and whether efficient communication can still be made even if the host I/O information 314 is sent at this moment.

If it is unnecessary to send the host I/O information 314 (step 704; No), the storage system 2 jumps to step 606.

Meanwhile, if it is necessary to send the host I/O information 314 (step 704; Yes), the storage system 2 sends it to the storage system 3 (step 705).

Incidentally, the storage system 2 ideally ensures the security of the host I/O information 314 by encrypting it before sending it to the storage system 3, so that it will not be leaked to the network 4.

The storage system 2 then judges whether it is necessary to send the performance information 324 to the storage system 3 (step 706).

Although the performance information 324 is essential to reproduce the internal processing conditions, the storage system 2 does not have to send it each time as long as there is no change in the information 324. In particular, the update frequency of the performance parameter table 501 is extremely lower than that of the host I/O information 314, accordingly, if the storage system 2 sends it once, the storage system 2 hardly needs to send it again. Also, it is only necessary for the storage system 3 to obtain the information stored in the performance condition table 502 at certain time intervals, and accordingly, the storage system 2 may send it to the storage system 3 with a lower frequency than the frequency the host I/O information 314 is sent at.

If it is unnecessary to send the performance information 324 (step 706; No), the storage system 2 terminates the processing routine.

Meanwhile, if it is necessary to send the performance information 324 (step 706; Yes), the storage system 2 sends it to the storage system 3 (step 707) and terminates the processing routine.

Incidentally, the storage system 2 preferably ensures the security of the performance information 324 by encrypting it before sending it to the storage system 3, so that it will not be leaked to the network 4.

Figure 8:
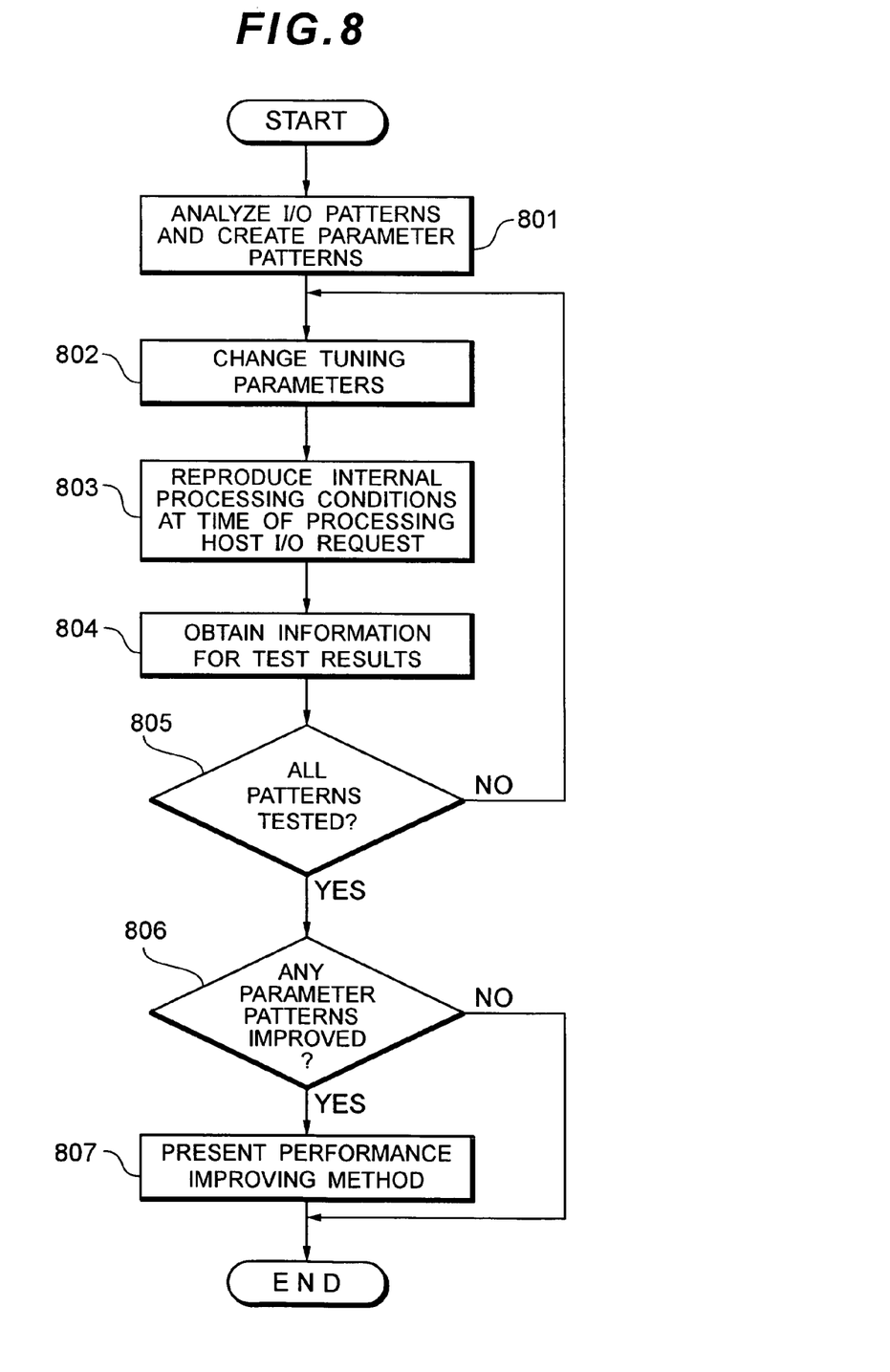
FIG. 8 is a flowchart showing a processing routine in which the performance-reproducing storage system makes proposals for performance improvement.

FIG. 8 is a flowchart showing the processing routine in which the storage system 3 reproduces the internal processing conditions and makes a proposal for performance improvement. The storage system 3 analyzes the host I/O patterns based on the host I/O information 314 and creates examples ("parameter patterns") of changes to be made in the settings for the tuning parameters having room for improvement (step 801).

For example, if an I/O request 110 issued by the application program 101 is divided into a plurality of I/O requests 111 due to the effects of the OS/FS/driver/HBA 102, the amount of data to be read-ahead may be set small.

When efficient performance tuning is not desired or when changes are required to be made to all the tuning parameter settings, step 801 is unnecessary.

The storage system 3 then changes the tuning parameter settings based on the parameter patterns created in step 801 (step 802). Here, it is unnecessary to perform a tuning test for those parameter patterns that have been tested once already. Also, because tuning sometimes requires a long period of time depending on the orders the parameter patterns are tested in, the parameter patterns are preferably tested in an appropriate order.

For example, in the case where tests are made for a RAID group having the structure (4D+1P) regarding the ON/OFF settings for the read-ahead mode and a drive configuration change from (4D+1P) to (5D+1P), the ON/OFF setting of the read-ahead mode is preferably tested first and then the drive configuration change from (4D+1P) to (5D+1P) is tested. Because the ON/OFF setting of the read-ahead mode relates to the internal controls in the storage system 3, that mode can be set in a short time and only places a small load on the storage system 3. On the contrary, the drive configuration change relates to external specifications for the storage system 3 and changing this tuning parameter requires data migration between a plurality of disk drives 202, and accordingly takes a long period of time and places a high load on the storage system 3.

In the situation where the storage system 3 has changed the tuning parameter settings in step 802, it then reproduces the internal processing conditions at the time the I/O request 111 was processed (step 803), and records the information for the test results in the local memory (step 804).

The test results obtained in step 804 include information regarding to what extent the response time to a host I/O request 111 has changed, as well as information regarding to what extent the resource use rate during the internal processing for a host I/O request 111 has changed, and this information is referred to when judging whether the I/O performance has been improved or not.

The storage system 3 then judges whether a tuning test has been performed for all the parameter patterns created in step 801 (step 805).

If a tuning test has not been performed for some of the parameter patterns (step 805; No), the storage system 3 returns to step 802.

If a tuning test has been performed for all the parameter patterns (step 805; Yes), the storage system 3 judges whether there is any parameter pattern, form among the foregoing parameter patterns, that has been improved in comparison to the tuning patterns in the storage system 2 (step 805).

Here this judgment is made in comparison to the tuning parameters set in the storage system 2, using the test results obtained in step 804, based on whether there is any parameter pattern that can reduce the host I/O response time or internal resource use rate (step 806).

If there is no parameter pattern that has been improved (step 806; No), it means that the tuning parameters set in the storage system 2 are optimal parameters, so the storage system 3 does not make any proposal for performance improvement and terminates the processing routine.

Meanwhile, when there are parameter patterns that have been improved (step 806; Yes), the storage system 3 presents performance improving methods (step 807).

Some performance improving methods require new devices, nonfree devices, high-performance options, or additional resources to change the tuning parameters. These are the costs the user pays in order to improve the I/O performance. Accordingly, any costs to be paid by the user to improve the performance are preferably indicated. Also, the degree of improvement in the I/O performance is preferably shown with concrete figures that indicate which I/O requests I/O processing has been improved for, and the extent of the improvement.

According to this example, it is possible to carry out performance tuning for the storage system 2 while taking into consideration the effects the OS/FS/driver/HBAs 102 in the host computer 1 have on the I/O requests 110 issued by the application program 101.

What is claimed is:

1. A computer system comprising:
   a host computer;
   a first storage system that processes an I/O request issued from the host computer; and
   a second storage system that receives host I/O information and performance information from the first storage system and reproduces, based on the host I/O information and performance information, the internal processing conditions of the first storage system at the time the I/O request was processed, thereby simulating I/O performance of the first storage system,
   wherein the second storage system changes the settings for tuning parameters into various settings while reproducing internal processing conditions of the first storage system at the time the I/O request was processed, thereby testing whether any improvement has been made in the performance.

2. The computer system according to claim 1, wherein the second storage system presents a user with an example of a change to be made in the settings for a tuning parameter having room for improvement.

3. The computer system according to claim 1, wherein the host I/O information contains any of: a reception time indicating the time when the first storage system received the I/O request from the host computer, a response time indicating the time when the first storage system completed the processing for the I/O request, a command data block of the I/O request, and the operation conditions of the first storage system at the time the I/O request was processed.

4. The computer system according to claim 1, wherein the performance information contains any of: the RAID type of a RAID group in the first storage system, a physical specification of a plurality of storage devices constituting the RAID group, and a resource usage rate for the first storage system.

5. A performance tuning method comprising:
   processing, in a first storage system, an I/O request issued from a host computer;
   sending host I/O information and performance information from the first storage system to a second storage system;
   reproducing, in the second storage system, internal processing conditions of the first storage system at the time the I/O request was processed, based on the host I/O information and performance information, thereby simulating the I/O performance of the first storage system; and
   changing the settings for tuning parameters into various settings while reproducing, in the second storage system, the internal processing conditions of the first storage system at the time the I/O request was processed, thereby testing whether any improvement has been made in the performance.

6. The performance tuning method according to claim 5, further comprising a step in which the second storage system presents a user with an example of a change to be made in the settings for a tuning parameter having room for improvement.

7. The performance tuning method according to claim 5, wherein the host I/O information contains any of: a reception time indicating the time when the first storage system received the I/O request from the host computer, a response time indicating the time when the first storage system completed the processing for the I/O request, a command data block of the I/O request, and the operation conditions of the first storage system 1 at the time the I/O request was processed.

8. The performance tuning method according to claim 5, wherein the performance information contains any of: the RAID type of a RAID group in the first storage system, a physical specification of a plurality of storage devices constituting the RAID group, and a resource usage rate of the first storage system.

* * * * *